(12) United States Patent
Baker

(10) Patent No.: US 10,717,318 B2
(45) Date of Patent: Jul. 21, 2020

(54) UNIVERSAL PAINT BRUSH HOLDER FOR PAINT BUCKETS

(71) Applicant: Patrick Baker, Stratford, CT (US)

(72) Inventor: Patrick Baker, Stratford, CT (US)

( * ) Notice: Subject to any disclaimer, the term of this patent is extended or adjusted under 35 U.S.C. 154(b) by 22 days.

(21) Appl. No.: 15/974,074

(22) Filed: May 8, 2018

(65) Prior Publication Data

US 2019/0344608 A1  Nov. 14, 2019

(51) Int. Cl.
*B44D 3/12* (2006.01)
*A46B 17/02* (2006.01)
*A47J 43/28* (2006.01)
*A47G 21/14* (2006.01)

(52) U.S. Cl.
CPC .............. *B44D 3/123* (2013.01); *A46B 17/02* (2013.01); *A47G 21/145* (2013.01); *A47J 43/287* (2013.01)

(58) Field of Classification Search
CPC ........ B44D 3/123; A47J 43/287; A47G 21/14; A47G 21/145; A46B 17/02; A47L 13/512
See application file for complete search history.

(56) References Cited

U.S. PATENT DOCUMENTS

| | | | | |
|---|---|---|---|---|
| 568,121 A | * | 9/1896 | Varian | A47L 13/512 248/113 |
| 1,474,733 A | * | 11/1923 | Richards | A47J 43/287 248/37.6 |
| 2,454,474 A | | 11/1948 | Nance | |
| 2,605,624 A | * | 8/1952 | Halladay | A47J 43/287 248/37.6 |
| 3,407,429 A | | 10/1968 | Nardo | |
| 3,536,285 A | | 10/1971 | Vaughn | |
| 4,299,340 A | * | 11/1981 | Hrytzak | B65D 25/48 222/189.07 |
| 4,993,671 A | * | 2/1991 | Ste. Marie | A46B 17/02 211/65 |
| 5,097,965 A | | 3/1992 | Fehr | |
| 6,056,253 A | * | 5/2000 | Tripp | A46B 17/02 248/110 |
| D459,848 S | * | 7/2002 | Anderson | D32/54 |
| 6,419,194 B1 | * | 7/2002 | LoSacco | A46B 17/02 248/110 |

(Continued)

FOREIGN PATENT DOCUMENTS

| | | | | |
|---|---|---|---|---|
| CH | 93783 A | * | 3/1922 | ........... A47G 21/145 |
| CH | 244301 A | * | 9/1946 | ........... A47G 21/145 |

(Continued)

*Primary Examiner* — Mollie Impink
(74) *Attorney, Agent, or Firm* — Allen F. Bennett; Bennett Intellectual Property

(57) ABSTRACT

A universal paint brush holder for paint buckets has a paint brush handle bracket extending perpendicularly from a slide fit speed clip which is removably attachable to the rim of an open paint bucket. The device accommodates paint brushes and paint buckets of a wide variety of sizes. The paint brush handle bracket has two arms that extend from a base outward and define a nook in which a paint brush handle is retained. The slide fit speed clip is formed from a front guide extending down from the front of the base and a back panel extending downward from the back of the base. The paint brush holder has no moving parts and is therefore durable, long-lasting and inexpensive to manufacture.

5 Claims, 4 Drawing Sheets

(56) References Cited

U.S. PATENT DOCUMENTS

| | | | |
|---|---|---|---|
| 6,616,110 B1* | 9/2003 | McIntee | B44D 3/123 |
| | | | 220/697 |
| D622,469 S* | 8/2010 | Nacey | D32/54 |
| D757,383 S | 5/2016 | Abbot et al. | |
| D798,136 S* | 9/2017 | Pittman | D8/382 |
| 2004/0173718 A1* | 9/2004 | Song | B44D 3/123 |
| | | | 248/213.2 |
| 2005/0035131 A1* | 2/2005 | Martinson | B44D 3/123 |
| | | | 220/736 |
| 2006/0113310 A1 | 6/2006 | Hawkins | |

FOREIGN PATENT DOCUMENTS

| | | | | |
|---|---|---|---|---|
| DE | 29912492 U1 * | 12/1999 | | A47G 21/145 |
| DE | 102010060100 A1 * | 4/2012 | | B44D 3/123 |

* cited by examiner

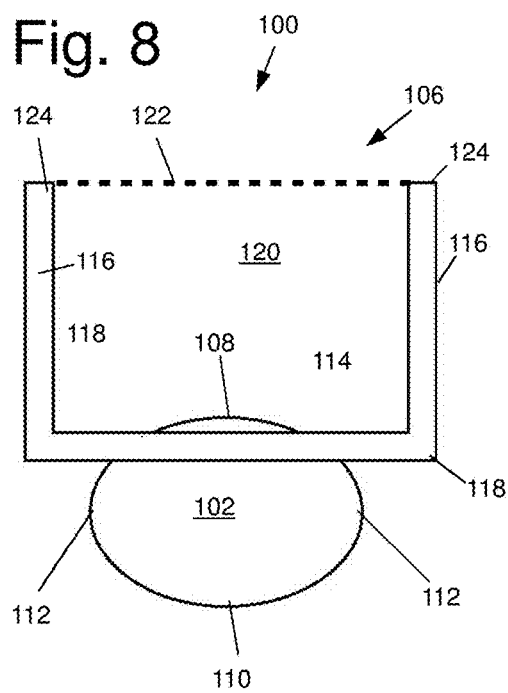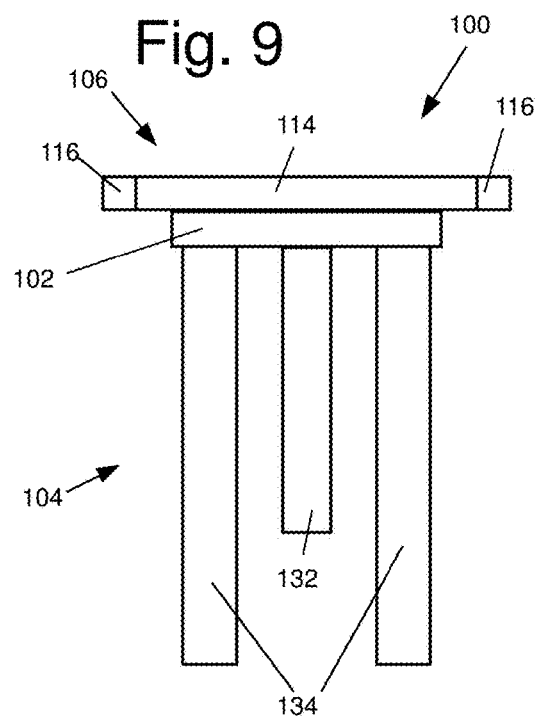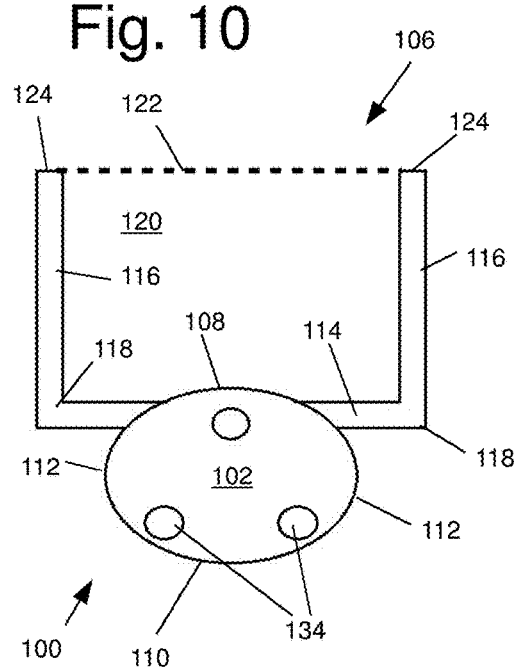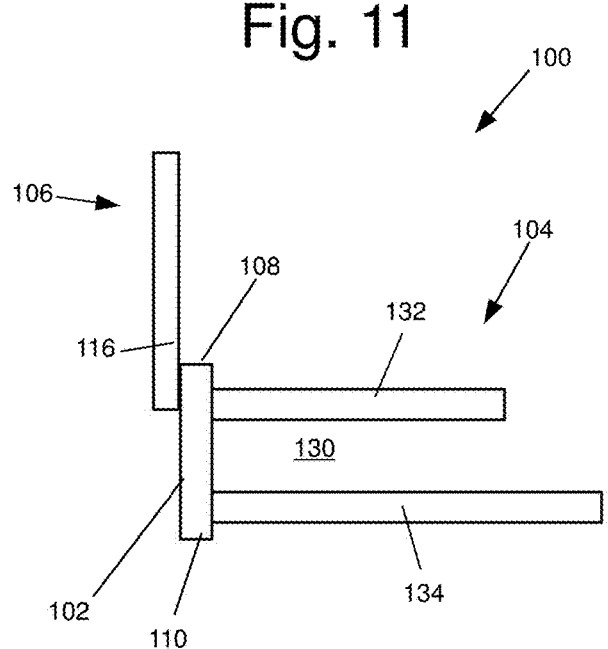

US 10,717,318 B2

UNIVERSAL PAINT BRUSH HOLDER FOR PAINT BUCKETS

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of the Invention

The present invention relates to a device for temporarily retaining a paint brush within a paint brush bucket. More particularly, the invention relates to a bracket that may be engaged to the rim of a paint bucket and retains a paint brush in an upright position and out of contact with the sides of the paint bucket.

Description of the Related Art painting a building, a room, or other object is often time-consuming and taking several hours worth of work to complete. Often it is necessary to stop the painting process temporarily in order to attend to other tasks or to simply take a break. However, this presents the problem of where to place a paint brush during a pause in the painting process. Because the paint brush is still wet, it's bristles will get paint on anything object upon which it is placed. Placing the paint brush within a paint bucket prevents this, but often results in the paint on the sides of the bucket getting on the paint brush handle. This presents another problem of getting paint on the hands of the operator.

A wide variety of paint brush holders have been offered over the years in an effort to obviate the problems outlined above. However, these prior devices have been found to exhibit one or more of several drawbacks, namely: they are relatively difficult to attach to and to detach from a paint container, sometimes requiring complex manipulations for proper placement, designed for a specific bucket or pail configuration and are not readily adapted to the variety of configurations encountered in the field, and/or generally cumbersome in construction and awkward in use The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

BRIEF SUMMARY OF THE INVENTION

Disclosed is a universal paint brush handle holder that may be affixed to a paint bucket to prevent it from falling over or getting paint on the handle. The device has no moving parts and may be used with paint buckets of any size or configuration.

In one embodiment, a universal paint brush holder for paint buckets has a base having a front, a back and two opposing sides, a paint brush handle retention bracket having two opposing arms each extending from one of the two opposing sides to the opposing arm's terminus, a paint brush handle nook defined by the two opposing arms, and having an opening into the paint brush handle nook defined by the termini of the two opposing arms, and a slide fit speed clip extending downward from the base and having a rectangular groove. The universal paint brush holder for paint buckets has no articulating components.

The speed clip has a rectangular groove formed between a front guide which extends downward from the front of the base and a back panel extending downward from the back of the base. Two opposing tabs extending into the opening from the termini of the two opposing arms. The paint brush handle retention bracket is U-shaped or rectangular. The front guide and back panel of the slide fit speed clip can be coextensive and rectangular, or of differing size and/or shape.

It is therefore an object of the present invention to provide a paint brush holder attachable to a paint bucket.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 8 is a top plan view of another alternative embodiment of a universal paint brush holder for a paint bucket in accordance with principles of the invention;

FIG. 9 is a front elevation view of another alternative embodiment of a universal paint brush holder for a paint bucket in accordance with principles of the invention;

FIG. 10 is a bottom plan view of another alternative embodiment of a universal paint brush holder for a paint bucket in accordance with principles of the invention;

FIG. 11 is a side elevation view of another alternative embodiment of a universal paint brush holder for a paint bucket in accordance with principles of the invention.

DETAILED DESCRIPTION

Figure 1:
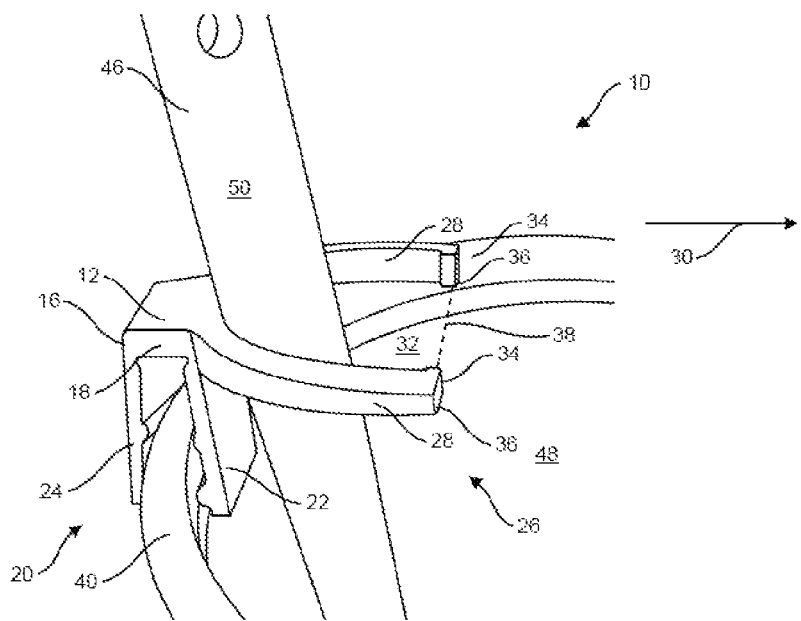
FIG. 1 is an environmental perspective view of a universal paint brush holder for a paint bucket in accordance with principles of the invention.
Figure 2:
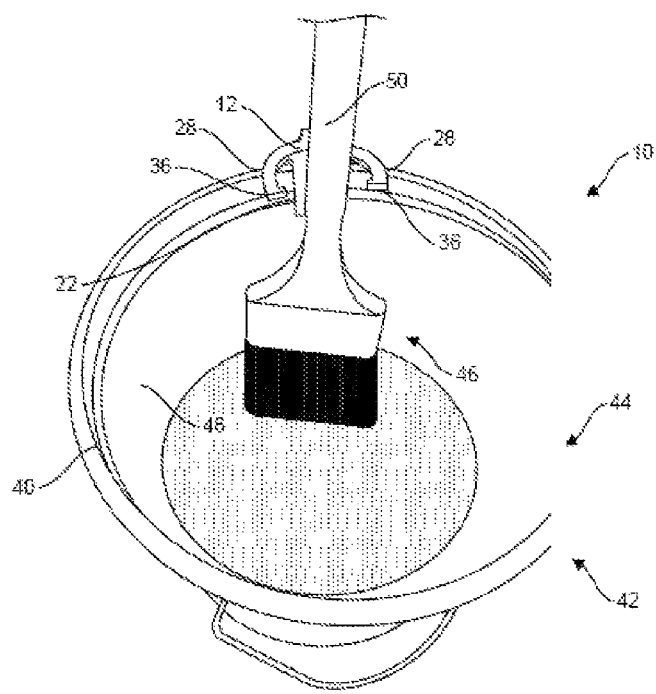
FIG. 2 is another environmental perspective view of a universal paint brush holder for a paint bucket in accordance with principles of the invention.
Figure 3:
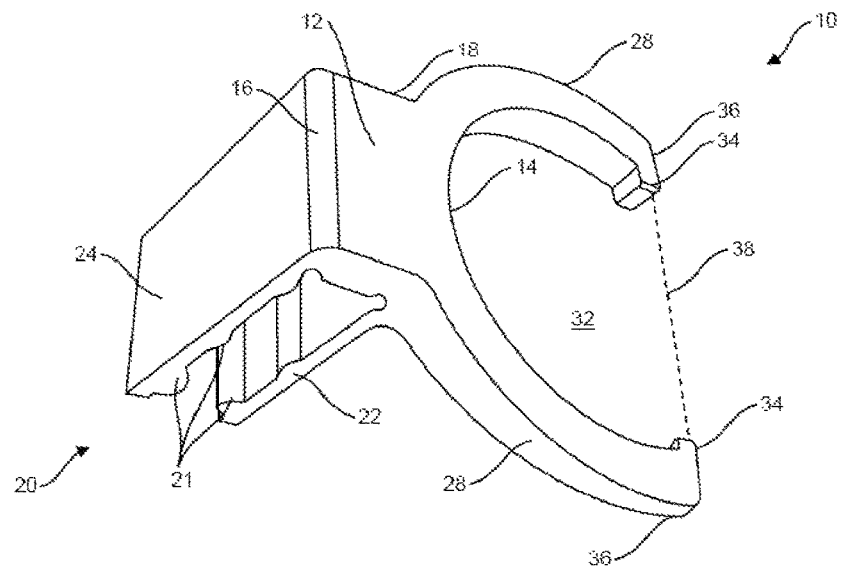
FIG. 3 is a perspective view of a universal paint brush holder for a paint bucket in accordance with the principles of the invention.
Figure 4:
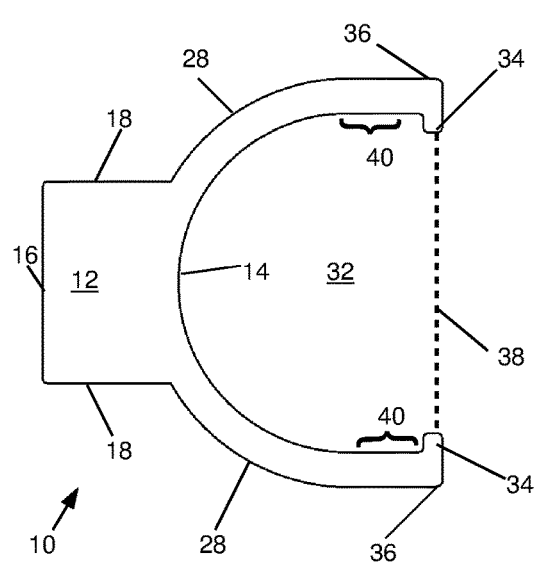
FIG. 4 is a top plan view of a universal paint brush holder for a paint bucket in accordance with principles of the invention.
Figure 5:
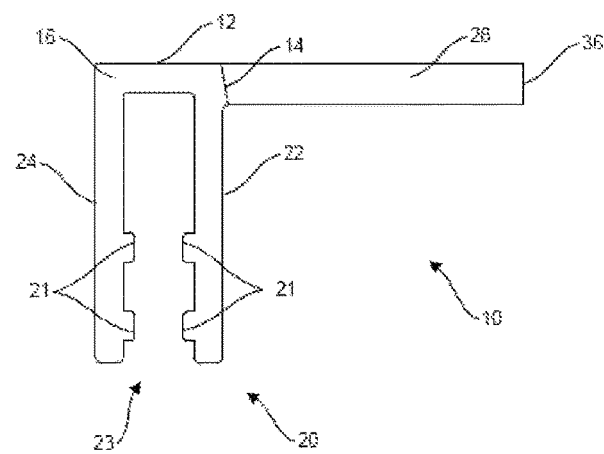
FIG. 5 is a side elevation view of a universal paint brush holder for a paint bucket in accordance with principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the term "opposing" is generally used when referencing two components that are mirror images of each other. For example, "two opposing arms" indicates that the two "arms" identified are structurally identical but opposite configurations. That is, the two opposing objects exhibit bilateral symmetry and are reflections of one another.

Disclosed is a universal paint brush holder for paint buckets in accordance with the principles of the invention. The universal paint brush holder may be used on paint buckets in a wide range of sizes. The universal paint brush holder is also configured to accommodate a wide variety of paint brushes of varying size and design. The paint brush holder has no moving parts and is therefore durable, long-lasting and inexpensive to manufacture.

FIGS. 1-5 show an embodiment of a universal paint brush holder for paint buckets 10 in accordance with the principles of the invention. The paint brush holder has a base 12 having a front 14 and a back 16 and two opposing sides 18. A slide fit speed clip 20 extends downward from the base 12 and has a groove 23 defined by a front guide 22 and a back panel 24. The front guide 22 extends downward from the front 14 of the base 12. The back panel 24 extends downward from the back 16 of the base 12. The front guide 22 and the back panel 24 are parallel such that the groove 23 is substantially rectangular and are coextensive, i.e. they have the same dimensions. As will be appreciated by skilled artisans, the term "speed clip" refers generally to a clip that is easily and quickly placed over objects and have no moving parts. The term "slide fit speed clip" refers more particularly to a speed clip having a rectangular groove, as opposed to speed clips having sides that angle inward, often formed from spring steel, in order to create a friction fit or compression fit about an object placed within its groove. In this embodiment, the slide fit speed clip 20 includes two sets of small ridges 21 within the groove. Optionally, the slide fit speed clip 20 may have a groove with smooth walls and no ridges. In this embodiment, the front guide 22 and back panel 24 are coextensive and mirror images of each other. In addition, front guide 22 and back panel 24 are both rectangular. Optionally, the front guide and back panel of a speed clip may or may not be coextensive, may or may not have the same shape, and may or may not be rectangular.

A retention bracket 26 is formed by two opposing arms 28 extending partially outward from the two sides 18 and in a forward direction 30, thereby forming a paintbrush handle nook 32 directly in front of the front guide 22. The two opposing arms 28 have opposing tabs 34 at their distal termini 36 that extend partially into the opening 38 of the paintbrush handle nook 32. In this embodiment, the retention bracket 26 has a U-shape and, due to the opposing tabs 34, has the appearance of a horseshoe. The two opposing arms 28 are semicircular and have straight regions 40 near their termini 36.

In use, the rim 40 of a paint bucket 42 is inserted into the slide fit speed clip 20 in an orientation such that the opposing arms 18 and the paintbrush handle nook 30 extend directly above the opening 44 of the paint bucket 42 defined by the rim 40. A paintbrush 46 may be placed into the paint bucket 42 proximal to the inside wall 48 of the paint bucket 42 below the paintbrush handle nook 32. The handle 50 of the paintbrush 46 is then placed within the paintbrush handle nook 32 resting against the retention bracket 26. The paintbrush handle nook 32 and its opening 38 are configured to be substantially larger than the handle of a typical paintbrush, but surrounds a paintbrush on three sides, thereby preventing it from sliding along the rim 40 of the bucket 42. The paintbrush 46 is retrieved from the brush holder simply by grasping the handle and lifting. When a paintbrush is held securely by a biased clip, it often requires two hands and/or application of force to remove the brush. The device of the present invention is far simpler to operate, never requiring more than one hand or any particular action to release a brush.

A brush held by the paintbrush holder 10 also prevents paint on the bristles from drying and ruining the paintbrush. The handle 50 and proximal region 54 of the paintbrush 46 are kept free of paint, while the distal, working portion of the bristles remains immersed of liquid paint.

Figure 6:
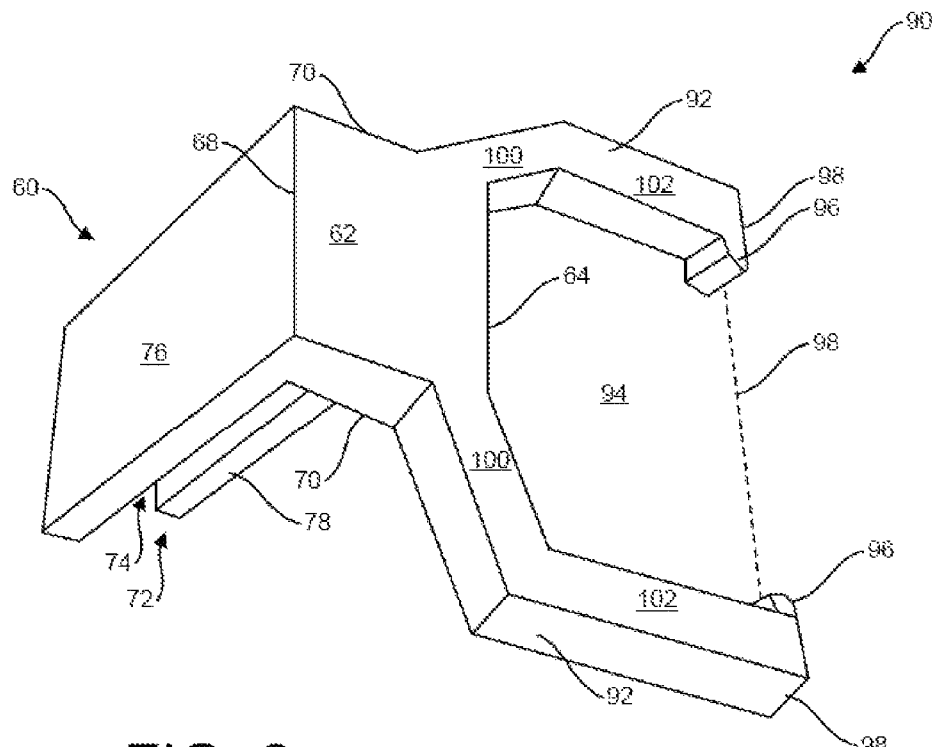
FIG. 6 is a perspective view of an alternative embodiment of a universal paint brush holder for a paint bucket in accordance with the principles of the invention.
Figure 7:
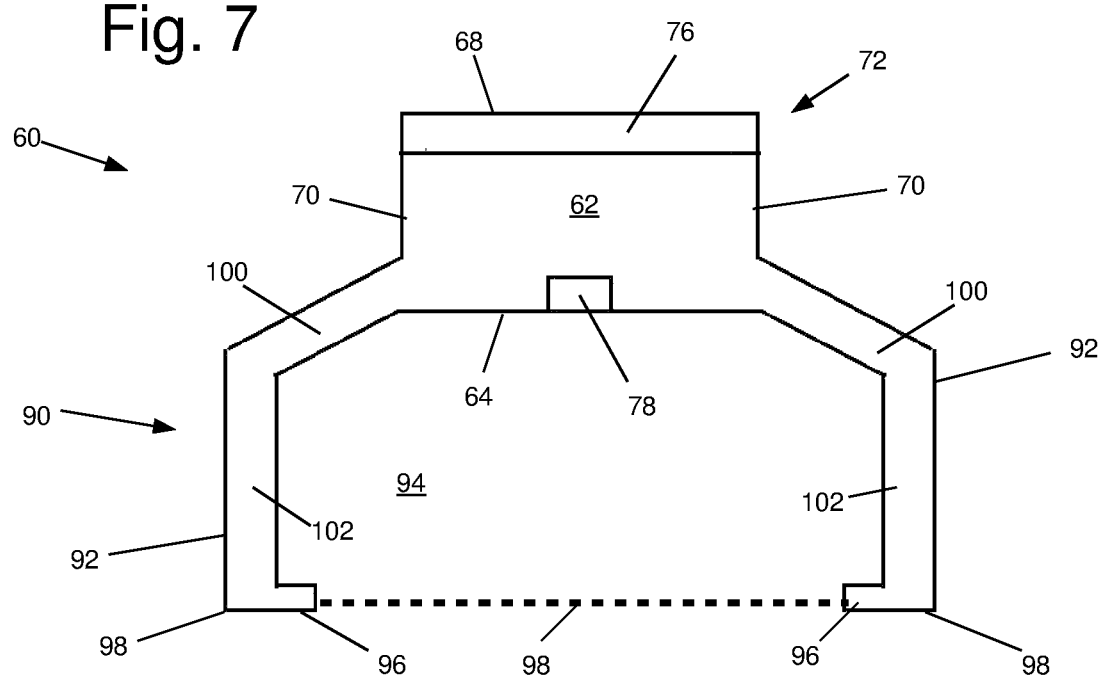
FIG. 7 is a bottom plan view of an alternative embodiment of a universal paint brush holder for a paint bucket in accordance with principles of the invention.

FIGS. 6-7 show an alternative embodiment of a universal paintbrush holder 60 for a paint bucket in accordance with the principles of the invention. The universal paintbrush holder for a paint bucket 60 has a base 62 having a front 64, a back 68, and two opposing sides 70. A speed clip 72 extends downward from the base 62 and has a groove 74 defined by a back panel 76 and a front guide 78. In this embodiment, the front guide 78 is substantially narrower than the back panel 76. The back panel 76 extends the entire distance between the opposing sides 70 of the base 62, but the front guide 78 does not.

The universal paintbrush holder 60 for a paint bucket has a retention bracket 90 formed from two opposing arms 92 extending outward and forward from the two opposing sides 70 and which define a paintbrush handle nook 94. Two opposing tabs 96 extend from the termini 98 of the opposing arms 92 into the opening 98 of the paintbrush handle look 94. In this embodiment, the opposing arms 92 are angular having two distinct regions. Laterally extending regions 100 extending from the opposing side 72 of the base 62 to the forward extending regions 102 of the opposing arms 92 which extend forward from the base 62.

Because the front guide 78 is substantially smaller than the back panel 76, the universal paintbrush holder for a paint bucket 60 may be used on even very narrow paint buckets whose rims have a small circumference in addition to standard or large sized paint buckets.

FIGS. 8-11 show another alternative embodiment of a universal paintbrush holder for a paint bucket 100 having a base 102, a speed clip 104 and a paintbrush handle retention bracket 106. In this embodiment, the base 102 is oval not rectangular. Thus there are no clearly identifiable boundaries between its front 108, back 110 and opposing sides 112. The paintbrush handle retention bracket 106 is formed from a transverse bar 114 extending outward from both of the opposing sides 112. Two opposing lateral arms 116 extend from the ends 118 of the transverse bar 114. The two opposing lateral arms 116 and the transverse bar 114 define a paintbrush handle nook 120 having an opening 122 defined by the termini 124 of the two opposing lateral arms 116. In this embodiment, there are no tabs at the termini 124 of the opposing lateral arms 116. As with the paintbrush handle retention brackets of the other embodiments, paintbrush handle retention bracket 106 lies in a plane and is perpendicular to the speed clip 104.

Speed clip 104 of this embodiment has a rectangular groove 130 formed between a front guide 132 and two back guides 134. The front guide 132 and back guides 134 are all comprised of cylindrical posts extending downward from the base 102. In addition, the front guide 132 has a length 136 smaller than the length 138 of the rear guides 134. The same design concept, having a front guide shorter than the back portion of the speed clip, may be used in other embodiments including embodiments having a back panel instead of two back guides.

All of the embodiments shown herein have speed clips and paintbrush handle retention brackets that do not apply force to the objects they engage. The speed clips do not affix to a paint buckets side by means of a friction fit or other securing mechanism. Similarly, the paintbrush handle retention brackets do not impinge upon paintbrush handles or use any mechanism that rigidly secures a paintbrush handle in place. As a result, they embodiments shown herein readily engage and disengage from both a paint bucket and a paintbrush without the need to apply any special type of force. This makes them particularly suitable for manipulation with one hand. For example, if either the speed clip and the brush handle retention bracket consisted of an alligator clip or other spring biased mechanism, an operator would have to use one hand to manipulate the biasing mechanism and a second hand to insert or remove the paintbrush. Those skilled in the art will appreciate that a device operable with only one hand is beneficial in the paintbrush industry.

In addition, the embodiments shown herein have no articulating components. That is, there are no components that move relative to each other, but are instead entirely static. This simplifies manufacture and is more durable than more complex devices. The slide fit speed clip and paint brush handle retention bracket are generally perpendicular to each other.

Whereas, the present invention has been described in relation to the drawings attached hereto, other and further modifications, apart from those shown or suggested herein, may be made within the spirit and scope of this invention. Those skilled in the art will appreciate that the conception, upon which this disclosure is based, may readily be utilized as a basis for the designing of other structures, methods and systems for carrying out the several purposes of the present invention. Descriptions of the embodiments shown in the drawings should not be construed as limiting or defining the ordinary and plain meanings of the terms of the claims unless such is explicitly indicated. The claims should be regarded as including such equivalent constructions insofar as they do not depart from the spirit and scope of the present invention.

The invention claimed is:

1. A universal paint brush holder for paint buckets comprising:
    a base having a front, a back, a first side, a second side and a horizontal width defined by a distance between the first side and the second side;
    a paint brush handle retention bracket having a first arm extending in a forward direction from the first side of the base to a first terminus, and a second arm extending in the forward direction from the second side of the base to a second terminus;
    a single paint brush handle nook defined by the first and second arms, and having an opening into the paint brush handle nook defined by the first terminus and the second terminus;
    a slide fit speed clip extending downward from the base and having a rectangular groove;
    wherein the slide fit speed clip and the rectangular groove are defined by a back panel extending downward from the back of the base and a front guide extending downward from the front of the base;
    wherein a distance between the first terminus and the second terminus is greater than the horizontal width of the base;
    wherein the slide fit speed clip is perpendicular to the first and second arms of the paint brush handle retention bracket;
    wherein the universal paint brush holder for paint buckets has no articulating components;
    wherein the front guide and back panel of the slide fit speed clip each have ridges protruding partially into the rectangular groove; and,
    wherein the front guide has a horizontal width that is less than the horizontal width of the base and the back panel has a horizontal width coextensive with the horizontal width of the base.

2. The universal paint brush holder for paint buckets of claim 1 further comprising a first tab extending into the opening from the first terminus and a second tab extending into the opening from the second terminus.

3. The universal paint brush holder for paint buckets of claim 1 wherein the paint brush handle retention bracket is U-shaped.

4. The universal paint brush holder for paint buckets of claim 1 wherein the paint brush handle nook is rectangular.

5. The universal paint brush holder for paint buckets of claim 4 further comprising a first tab extending into the opening from the first terminus and a second tab extending into the opening from the second terminus.

* * * * *